US012333261B2

(12) United States Patent
Hsieh

(10) Patent No.: US 12,333,261 B2
(45) Date of Patent: Jun. 17, 2025

(54) CONVERSATIONAL DEVICE FOR GENERATING A SPECIFIC PERSONNEL'S VIRTUAL PERSONALITY USING LARGE LANGUAGE MODEL

(71) Applicant: Morphusai Co., Ltd., Taipei (TW)

(72) Inventor: Chia-Chun Hsieh, Taichung (TW)

( * ) Notice: Subject to any disclaimer, the term of this patent is extended or adjusted under 35 U.S.C. 154(b) by 0 days.

(21) Appl. No.: 18/807,592

(22) Filed: Aug. 16, 2024

(65) Prior Publication Data

US 2025/0173511 A1 May 29, 2025

(30) Foreign Application Priority Data

Nov. 28, 2023 (TW) ................................ 112146127

(51) Int. Cl.
*G06F 17/00* (2019.01)
*G06F 40/35* (2020.01)

(52) U.S. Cl.
CPC .................................... *G06F 40/35* (2020.01)

(58) Field of Classification Search
None
See application file for complete search history.

(56) References Cited

U.S. PATENT DOCUMENTS

| | | | | |
|---|---|---|---|---|
| 10,437,936 | B2 * | 10/2019 | DeFelice | G06N 3/045 |
| 10,540,446 | B2 * | 1/2020 | DeFelice | G06N 7/01 |
| 10,607,595 | B2 * | 3/2020 | Kingsbury | G10L 13/047 |
| 10,846,488 | B2 * | 11/2020 | DeFelice | G06F 40/216 |
| 10,902,214 | B2 * | 1/2021 | DeFelice | G06F 40/56 |
| 11,120,895 | B2 * | 9/2021 | Shriberg | A61B 5/4803 |
| 11,669,689 | B2 * | 6/2023 | DeFelice | G06N 3/045 |
| | | | | 704/9 |
| 2021/0110895 | A1 * | 4/2021 | Shriberg | G16H 10/20 |

FOREIGN PATENT DOCUMENTS

CN 115952272 4/2023

OTHER PUBLICATIONS

English translation of CN115952272, Apr. 11, 2023.

* cited by examiner

*Primary Examiner* — Satwant K Singh

(57) ABSTRACT

The present invention provides a conversational device for generating a specific personnel's virtual personality using a large language model, which includes a long-term memory for receiving and storing processed text data of a target personnel, a virtual personality model utilizing the processed text data and a connected large language model (LLM) to train and to generate the target personnel's personality and dialogues, a short-term memory used to receive the virtual personality and dialogues that match the target personnel to update iterative training data, enabling the dialogue device to maintain coherence with previous dialogues, and an interactive module that allows users to interact with the generated virtual personality and to generate multiple rounds of dialogue and provide summary of the previous dialogs.

13 Claims, 5 Drawing Sheets

CONVERSATIONAL DEVICE FOR GENERATING A SPECIFIC PERSONNEL'S VIRTUAL PERSONALITY USING LARGE LANGUAGE MODEL

CROSS-REFERENCE TO RELATED APPLICATIONS

This patent application is based on, and claim priority from Taiwan patent application serial number 112146127, filed on Nov. 28, 2023, the disclosure of which is hereby incorporated by reference herein in its entirety.

TECHNICAL FIELD

The present invention relates to a conversational device, and more particularly, to a conversational device for generating a specific personnel's virtual personality using large language model.

BACKGROUND OF RELATED ARTS

With the enhancement of computer computing power and the development of big data technology, natural language processing (NLP) is becoming an important branch in the field of artificial intelligence (AI). Large language models (LLM), such as Chatgpt, LLaMA, and Bard, can understand and generate natural language texts through training on massive datasets including textual contents. However, conventional language models often lack the ability to accurately model specific individuals and their styles.

Nowadays, virtual assistants and chatbots available on the market lack personality and realism. While they can answer basic questions from customers, they often fail to deliver an interactive experience that matches their specific personality and style. Additionally, creating and training a model that can simulate a specific personality often requires significant amounts of expert knowledge and computing resources, making it impractical for many developers and small business entities. Conventional language models often cannot effectively simulate the conversational style and knowledge background of a specific character, mainly due to lacking the character's contextual relevance and memory capabilities. In order to solve this problem, new method is needed to enhance the character simulation capabilities of language models.

SUMMARY

The purpose of the present invention is to provide a conversational apparatus that uses a large language model to generate a virtual personality of a specific personnel, which includes a processor, a storage device coupled to the processor, a long-term memory stored in the storage device and accessible through the processor for receiving and storing processed textual data of a target personnel, a virtual personality model stored in the storage device and accessible through the processor, trained by a large language model connected thereto and the processed textual data to generate virtual personality and dialogue matching the target personnel, and a short-term memory stored in the storage device and accessible through the processor, configured to couple with the virtual personality model, used to receive the virtual personality and dialogue matching the target personnel to update iterative training data, enabling the conversational apparatus to maintain coherence with previous dialogues, and an interactive module, stored in the storage device and accessible through the processor, configured to couple with the virtual personality model, allowing a user to interact with the virtual personality model to generate multi-round dialogue and providing summary of previous-round dialogue.

In one embodiment, the conversational apparatus further comprises a data collection and analysis module configured to couple with the long-term memory, used to collect, clean and format the textual data of the target personnel.

In one embodiment, both the long-term memory and the short-term memory are database.

In one embodiment, the conversational apparatus further includes a prompt input interface configured to input prompts, which include personality setting of the target personnel, to simulate conversation style and knowledge background of the target personnel; the prompt input interface is configured to couple with the virtual personality model.

In one embodiment, the generated multi-round dialogue and summary of previous-round dialogue are cleaned and formatted through the data collection and analysis module, and then are fed into and stored in the short-term memory, thereby maintaining coherence with previous conversations generated by the conversational apparatus and knowledge background of the target personnel, and improving context understanding ability of the virtual personality model. The virtual personality model based on the large language model is trained by utilizing the processed textual data and the personality setting of the target personnel as training guidance, and trained through dialoguing between the virtual personality model and the large language model.

In one embodiment, the virtual personality model is based on a transformer architecture and has a deep learning architecture for processing sequence data, which includes multiple layers of encoder and decoder with a self-attention mechanism used to capture long-range dependencies in the sequence data. The large language model includes Chatgpt, LLaMA, and Bard.

In one embodiment, the conversational apparatus is used to generate a virtual personality and dialogue of the target personnel, including performing the following steps through the processor: performing training on the virtual personality model by utilizing the large language model and the processed textual data of the target personnel; checking whether training data for the virtual personality model is sufficient; if the training data is enough, then the user interactive module generates summary of conversations between the user and the trained virtual personality model based on conversational style, knowledge background and personality traits of the target personnel; otherwise, the trained virtual personality model generates conversational texts matching the virtual personality of the target personnel to dialogue with the large language model.

In one embodiment, the user interactive module is an interactive interface disposed in the conversation device or in the user terminal.

In one embodiment, the processor includes a multi-core central processing unit (CPU), a graphics processor unit (GPU), a digital signal processor (DSP), an application specific integrated circuit (ASIC), or their combinations.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention provides a conversational device based on a large language model (LLM) for creating virtual personality or retaining real personality. The device can capture and reproduce people's language patterns, emotions and ways of thinking, thereby creating or retaining virtual characters with specific personality traits.

In order to achieve the above objectives, the present invention proposes a new device and execution steps, which utilize a large language model (LLM) to train and generate virtual personality and dialogue of a specific personnel. By creating the long-term memory and short-term memory for the character's personality, together with utilizing the instructions or questions (prompts) set for the character (target personnel), the large language model can more accurately simulate the conversation style and knowledge background of a specific personnel's personality and can create virtual personalities with natural, personalized and real interactive experiences.

Figure 1:
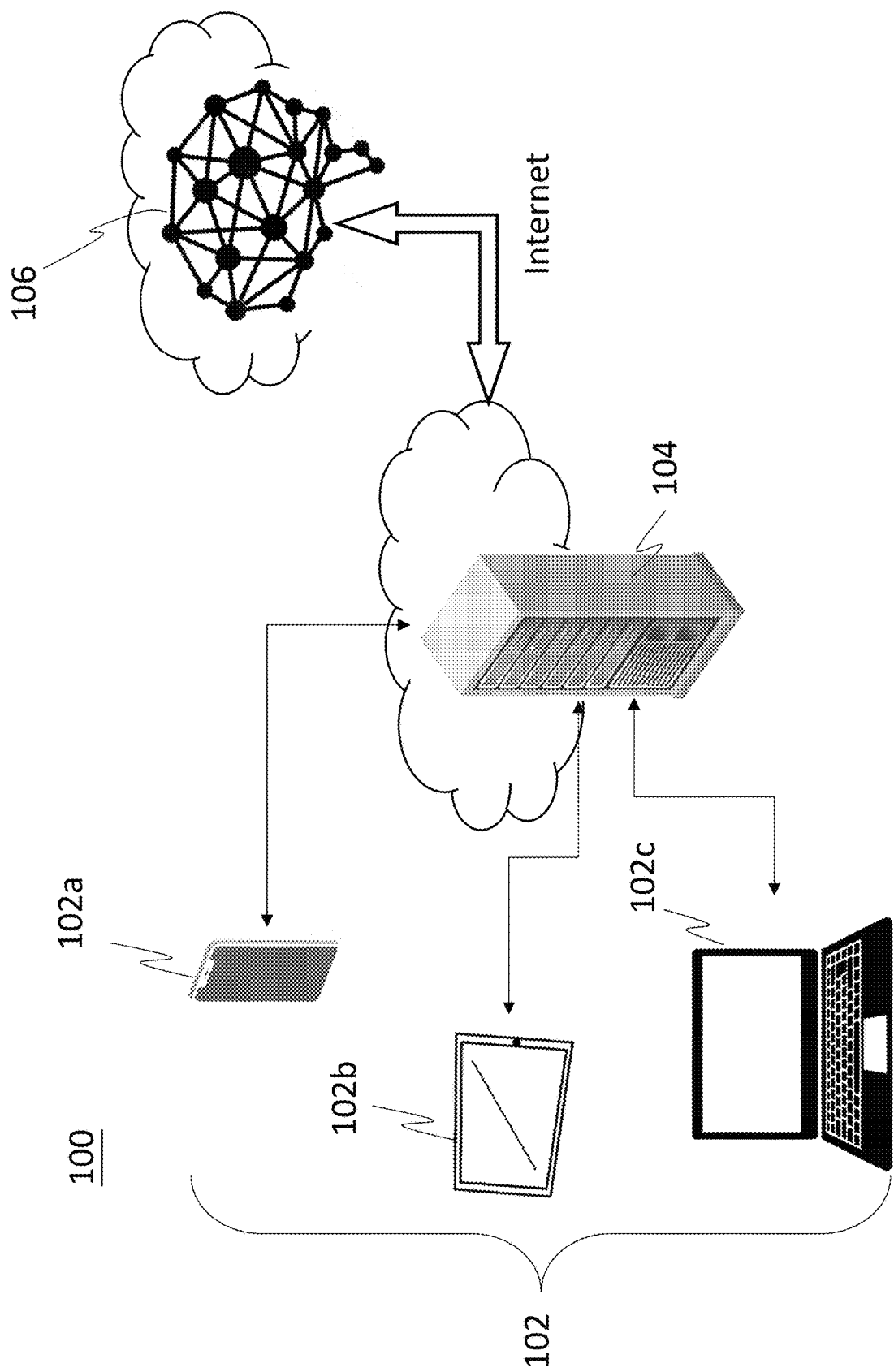
FIG. 1 shows a system architecture of the present invention.

FIG. 1 shows a system architecture 100 of the present invention, which includes a user terminal 102, a virtual personality creation system 104 and a large language model (LLM) server 106. The virtual personality creation system 104 involves the core concept of the present invention and is used to interact with the large language model (LLM) server 106 and the user terminal 102. Its technical details will be detailed in subsequent paragraphs. According to embodiments of the present invention, the virtual personality creation system 104 can be a server under a cloud architecture, and the user terminal 102 can communicate with it through a communication network. The aforementioned large language model (LLM) server 106 is a server under a cloud architecture and can communicate with the aforementioned virtual personality creation system 104 through the Internet.

In one embodiment, the user terminal 102 may be selected from user's electronic computing devices with wired or wireless communication functions such as smart phones 102a, tablet computers 102b, notebook computers 102c, PDAs, or personal computers. However, it is not limited to these listed electronic computing devices.

According to embodiments of the present invention, the communication network may include but not limited to: any wired or wireless communication network, such as TCP/IP communication network, Wi-Fi network, LAN network, WAN network and the Internet.

According to embodiments of the present invention, the communication network can be implemented by using, for example, Ethernet, GSM, CDMA, TDMA, Bluetooth, VoIP, Wi-MAX, Wibro or any other various wired or wireless communication protocols.

Figure 2:
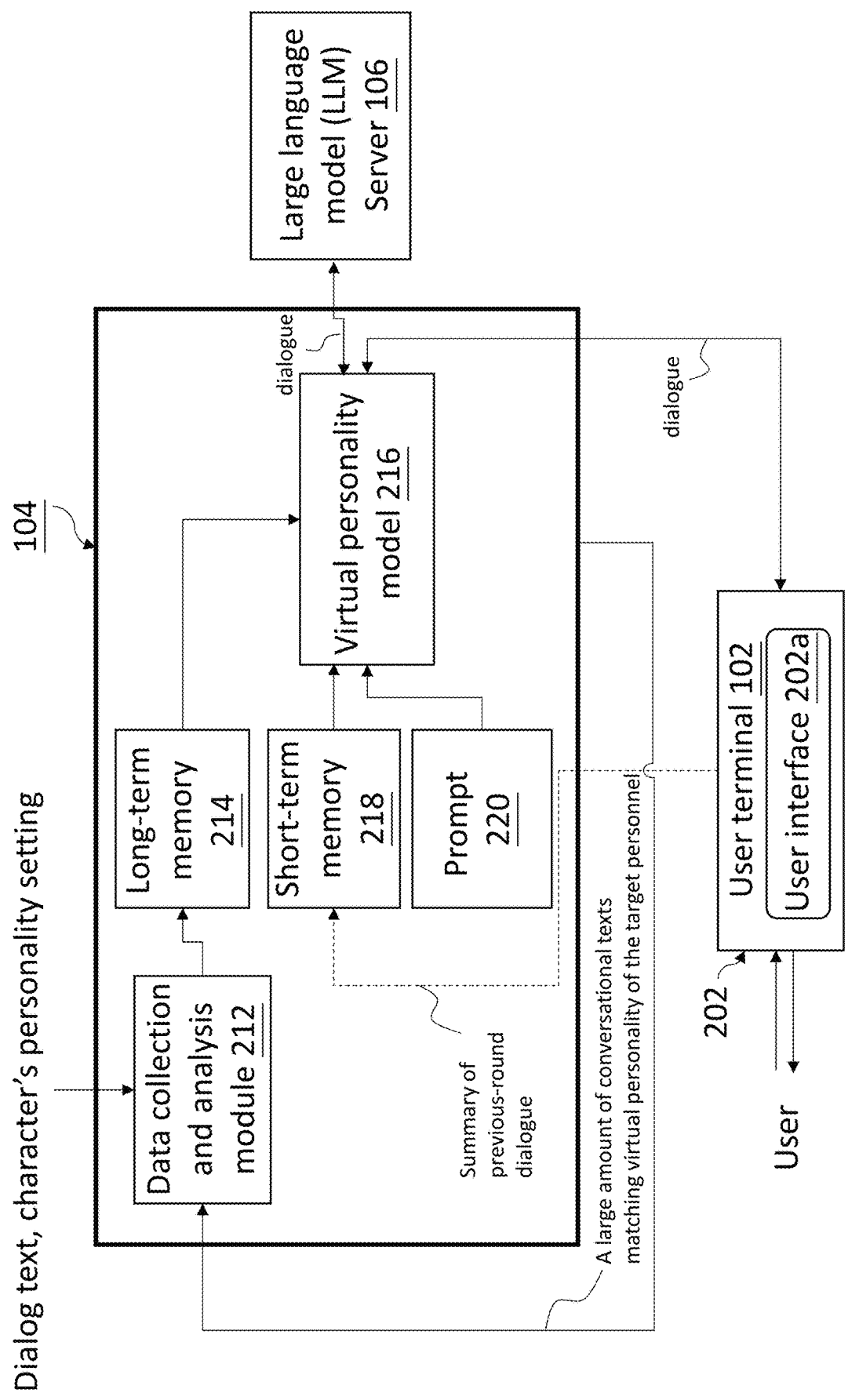
FIG. 2 shows a system block diagram of a conversational device for generating a virtual personality of a specific personnel using a large language model according to an embodiment of the present invention.
Figure 4:
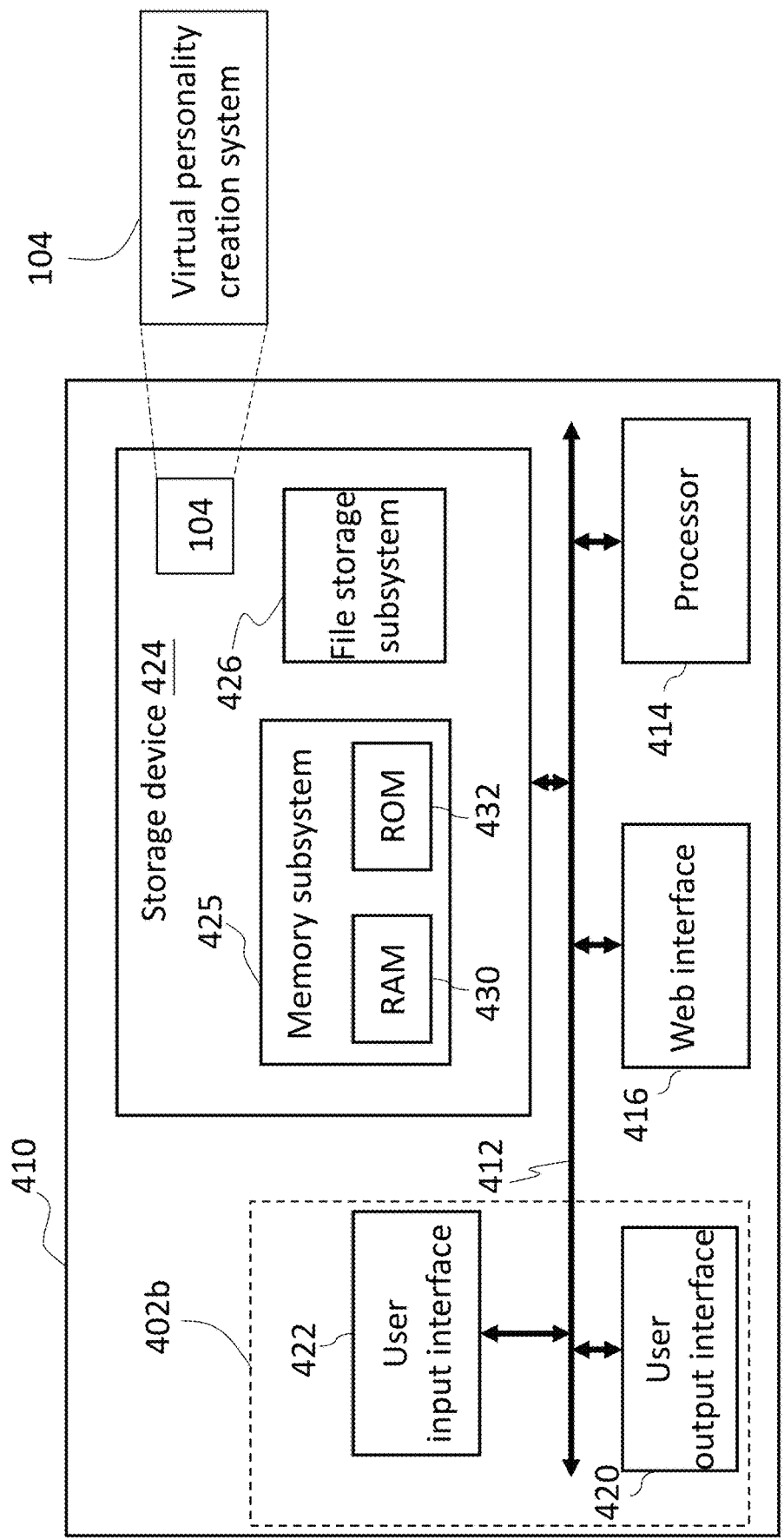
FIG. 4 shows a functional block diagram of an exemplary computer system/server for implementing embodiments of the present invention.

According to an embodiment of the present invention, with reference to FIG. 2 and FIG. 4, the virtual personality creation system 104 proposed by the present invention is a conversational device or apparatus that generates a virtual personality of a specific personnel through a large language model (LLM), which includes the following main parts:

Data collection and analysis module 212: By operating the processor 414, the data collection and analysis module 212 will extract and organize information from a large amount of textual and conversational contents of the target personnel (that is, collect and analyze the textual data of the target personnel) and store them in the long-term memory 214, which is a database stored in the storage device 424, used as training materials to construct and form the character. This long-term memory 214 will serve as the basis for model training, helping a virtual personality model 216 to understand and simulate the conversational style and knowledge background of a specific character (i.e. target personnel). According to one embodiment of the present invention, the data collection and analysis module 212 cleans, formats and tokens the collected language data about a specific personnel (target personnel), such as texts, conversation records or other forms of language expression, and stores them in the long-term memory 214 connected to the data collection and analysis module 212 for training the virtual personality model 216.

Virtual personality model 216: By operating the processor 414, the virtual personality model 216 can be trained by utilizing the large language model (LLM) and collected data to generate a model of a specific personnel's virtual personality and dialogue. According to one embodiment of the present invention, the virtual personality model 216 based on a large language model (LLM) can be operated by the processor 414, utilizing the cleaned and formatted language data of the target personnel stored in the long-term memory 214 together with the personality settings (set by the prompt input interface (prompt) 220) as training guidelines, and can be trained through an external connected large language model (LLM) (installed in the large language model (LLM) server 106). According to one embodiment of the present invention, the virtual personality model 216 is based on a transformer architecture, which is a deep learning architecture for processing sequence data, including multiple encoder and decoder layers with self-attention mechanism to capture long-range dependencies in the sequence data. According to one embodiment of the present invention, the virtual personality model 216 is operated by the processor 414, and the training process includes: (a) processing textual data and converting them into a digital representation that can be used in the model; (b) randomly assigning parameters of the model; (c) transmitting the digital representation of the textual data to the model; (d) learning through minimizing cross-entropy loss of next word; (e) updating weight in the model through back propagation algorithm to optimizing parameters of the model; (f) repeat the process until the output of the model reaches required accuracy. According to some embodiments of the present invention, once the virtual personality model 216 is trained, it can perform a variety of natural language processing (NLP) tasks, such as text generation, semantic understanding, sentiment analysis, question and answer, etc., and can understand complex language structures and meaning. Therefore, the trained virtual personality model 216 can be used to generate natural, fluent, and reasonable textual contents. The virtual personality creation system 104 uses the virtual personality model 216 to generate a large amount of conversational texts that match virtual personality and dialogue of the target personnel, thereby solving the shortage of textual contents of some character's personality; then, the data is cleaned, formatted and tokenized through the data collection and analysis module 212, and then the large amount of conversational texts that match virtual personality and dialogue of the target personnel are stored in the long-term memory 214. The trained virtual personality model 216 can generate summary of a large amount of conversations through interacting with user and then import them into a short-term memory 218, which is also a database, for updating iterative training data, allowing the virtual personality creation system 104 to maintain coherence with previous dialogue and knowledge backgrounds, thereby improving contextual understanding ability of the virtual personality model 216. Among them, the short-term memory 218 is connected between the data collection and processing module 212 and the virtual personality model 222.

Interactive module 202: It includes a user interface 202*a* that can exist within the virtual personality creation system 104 or be connected to the virtual personality creation system 104 by an external user terminal 102, allowing the user to interact with the generated virtual personality that matches the target personnel (i.e. the trained virtual personality model 216), to communicate, generate multi-round dialogue and provide a summary of the previous-round dialogue for offering the user with a natural and meaningful dialogue experience.

According to an embodiment of the present invention, the virtual personality model 216 can understand the context coherence of the multi-round dialog by utilizing the long-term memory 214 and the short-term memory 218, and can simulate the conversational style and knowledge background of the target personnel by inputting specific prompts, which can be character's personality settings, through the prompt input interface 220.

According to an embodiment of the present invention, the multi-round dialogue and the summary of the previous-round dialogue that are generated by the interactive module 202 are then cleaned and formatted through the data collection and analysis module 212, and then are fed into and stored in the short-term memory 218 to maintain coherence with previous conversations and knowledge background, thereby improving the context understanding ability of the virtual personality model.

In the present invention, a large language model (LLM) is used to train and generate the personality and dialogue of a specific personnel. By leveraging the natural language understanding capabilities of large language models (LLM), its LLM architecture and deep training mechanism can enable it to capture the nuances and complex structure of human language. Among them, the large language model (LLM) includes Chatgpt, LLaMA, Bard, etc. installed in the external large language model (LLM) server 106.

In the present invention, the parameters of the large language model (LLM), such as model size (number of layers and dimensions of hidden units), learning rate and training data size, etc., can be adjusted according to specific application requirements.

Figure 3A:
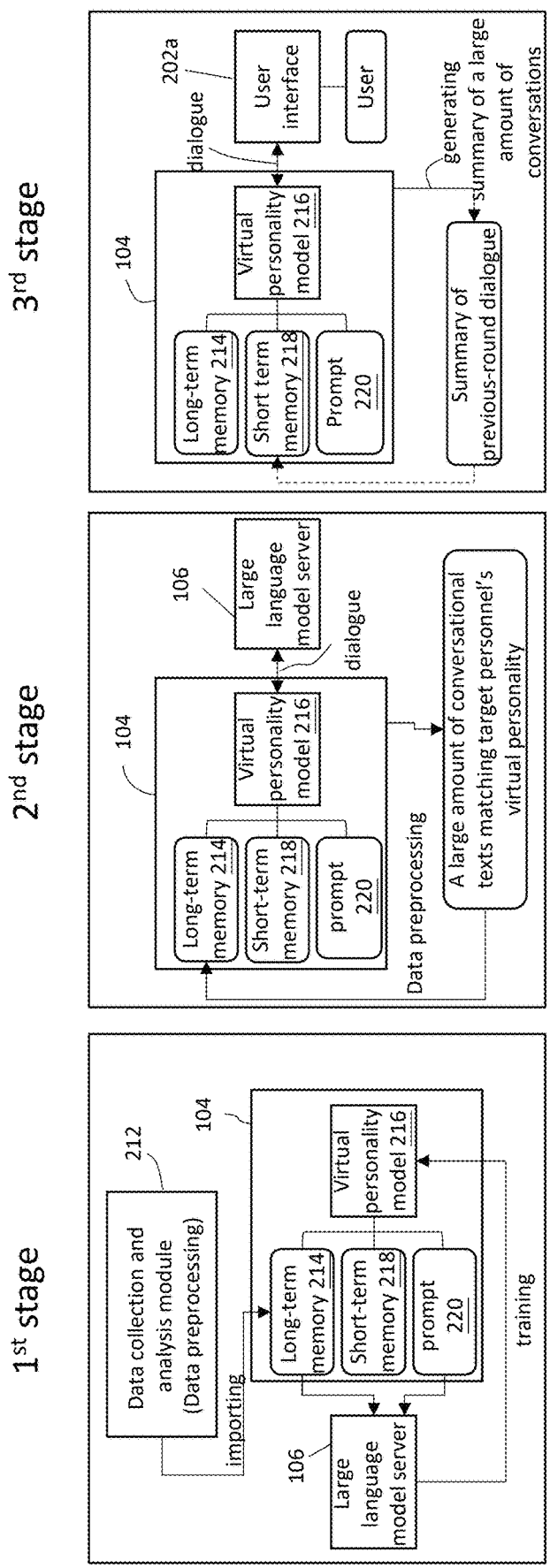
FIG. 3A shows the process of generating a virtual personality and dialogue for a specific personnel (target personnel) using the conversational device shown in FIG. 2 according to the present invention.

FIG. 3A shows the process of using the conversational device illustrated in FIG. 2 to generate a virtual personality and dialogue for a specific personnel (target personnel) according to the present invention. The above process can be divided into three stages. The first stage is the initial training stage; the second stage is a stage of generating a large amount of conversational texts matching the target personnel's personality, this stage can be skipped if there is sufficient data provided at the first stage. The third stage is a stage of generating summary of a large amount of conversations. In the first stage, i.e. the initial training stage, the collected textual and conversational contents of the target personnel is preprocessed by the data collection and analysis module 212 to generate cleaned and formatted data, and then is introduced into the long-term memory 214. The cleaned and formatted data has been fed into the long-term memory 214 in conjunction with prompts, such as the personality setting of the target personnel, are then used as training guidelines for guiding an external connected large language model (installed in the large language model server 106) to execute initial training on the virtual personality model 216 of the virtual personality creation system (i.e., the conversational device/apparatus) 104. If the textual and conversational contents of the target personnel collected in the initial training stage (the first stage) are sufficient, the virtual personality model 216 is completely trained and can be used in this stage, then the second stage can be skipped and directly perform the third stage. Otherwise, the second stage needed to be performed, in this stage, the virtual personality model 216 dialogues with the external coupled large language model (LLM), and then generates a large amount of conversational texts matching virtual personality and dialog of the target personnel to fix the shortage issue of personality textual data of some characters, and then these conversational texts are fed into the data collection and analysis module 212 for data preprocessing, and then are introduced to the long-term memory 214. In the third stage, the trained virtual personality model 216 can generate summary of a large amount conversations through interaction with users and import the summary into the short-term memory 218 for updating iterative training data, so that the system can maintain the same coherence relationship with previous dialogue and knowledge backgrounds, thereby improving the context understanding ability of the virtual personality model 216.

Figure 3B:
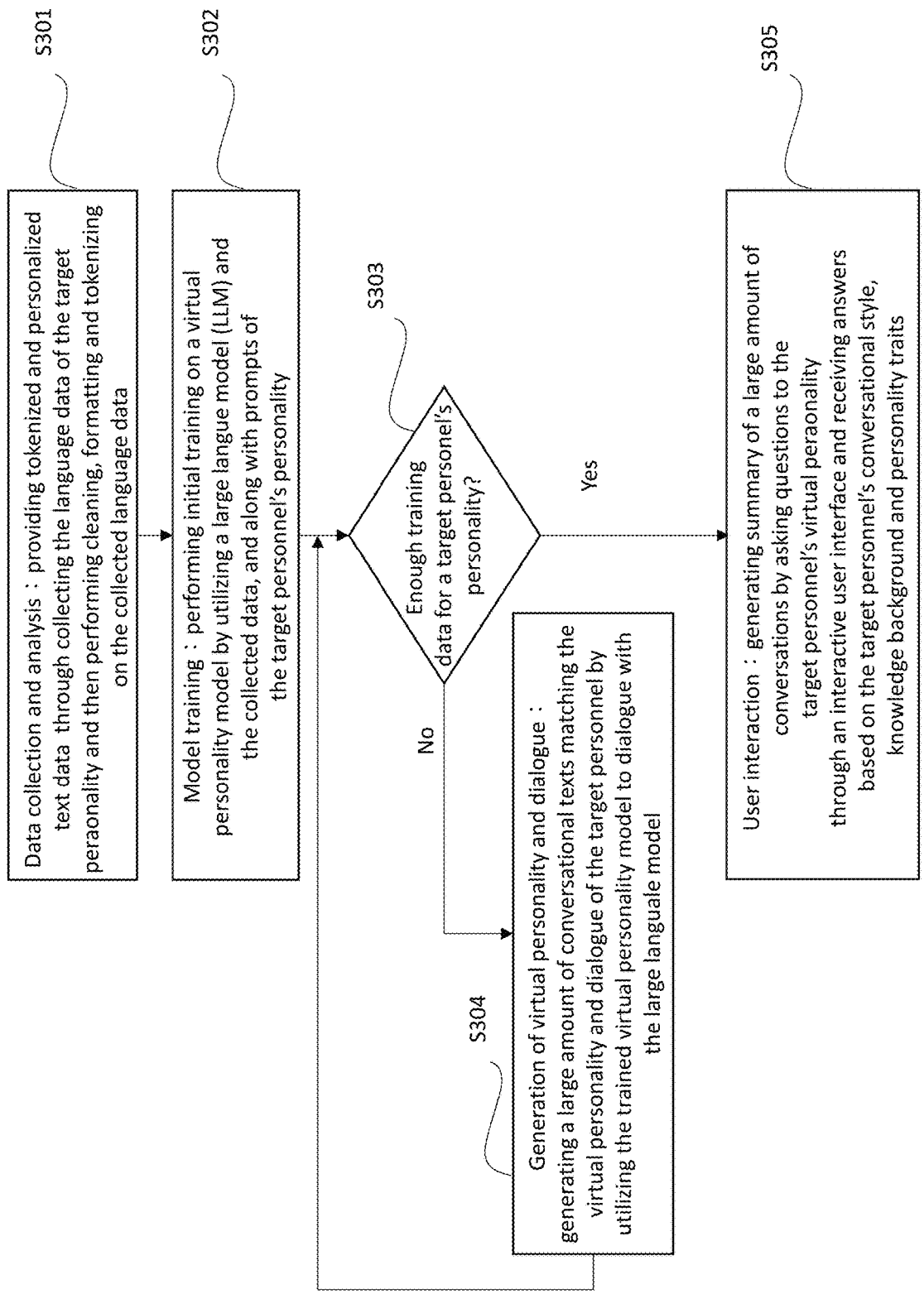
FIG. 3B is a conversational device for generating a virtual personality of a specific personnel using a large language model according to an embodiment of the present invention, and the execution steps of generating a virtual personality and dialogue for a specific personnel (target personnel).

According to the content of the training phase described in FIG. 3A, the conversational device mentioned in FIG. 2 is used to generate virtual personalities and dialogue for specific personnels. Please refer to FIG. 3B for explaining the detailed execution steps, which includes utilizing the processor 414 (refer to FIG. 4) to perform the following steps: first, in step S301, data collection and analysis: providing tokenized and personalized textual data by the data collection and analysis module 212 (refer to FIG. 2) through collecting the language data of the target personnel's personality and then analyzing the data, for example performing cleaning, formatting and tokenizing on these collected language data (in form of textual data); in step S302, model training: performing initial training on a virtual personality model 216 by utilizing an external coupled large language model (LLM), the collected tokenized and personalized textual data (stored in the long-term memory 214), together with the prompts of the target personnel's personality; this training process further includes: (a) enhancing the contextual understanding and coherence of the virtual personality model 215 by using the tokenized and personalized textual data stored in the long-term memory 214 and the short-term memory 218; and (b) simulating the conversational style and knowledge background of the target personnel through specific prompts such as character's personality settings; in step S303, training evaluation: evaluating the training of the virtual personality model 216 by checking if the training data is sufficient for a target personnel's personality, if yes, then executes step S305, otherwise executes step S304; in step S304, generation of virtual personality and dialogue: generating a large amount of conversational texts matching virtual personality and dialog of the target personnel through utilizing the trained virtual personality model to dialogue with the large language model, performing data preprocessing and then importing them into the long-term memory 214; in step S305, user interaction: generating summary of a large amount of conversations by asking questions to the virtual personality of the target personnel (i.e. the trained virtual personality model 215) through an interactive interface, such as the user interface 202a provided on the user terminal 102 (refer to FIG. 2), and receiving answers based on the target personnel's conversational style, knowledge background and personality traits.

The following paragraphs provide examples of specific implementations:

Example 1: Customized Virtual Personality of Famous Figures

In this example, the goal is to create an avatar of a famous scientist, such as Albert Einstein. The specific construction method of virtual personality follows the following steps:
  (1). Data collection: Collecting Einstein's textual dialogue and writing from public documents, speeches and interviews.
  (2). Data processing: Cleaning and formatting the collected data to prepare them for training.
  (3). Model training: Using a large language model (LLM) and the collected data, training a model to generate textual data that matches Einstein's writing and conversational style.
  (4). Generation of personality and dialogue: Utilizing the trained model to generate Einstein's virtual personality and dialogue, allowing users to interact with virtual Einstein.
  (5). User interaction: Allowing users to ask questions to the virtual Einstein personality through an interactive interface and receive answers based on Einstein's existing writing and conversational style.

Example 2: Customized Virtual Coach's Personality

In this example, the goal is to create a virtual coaching personality that can provide fitness and nutrition advices. The specific construction method of virtual coach's personality follows the following steps:
  (1). Data collection: Collecting textual information collected from blogs, books and interviews of fitness and nutrition expert.
  (2). Data processing: Cleaning and formatting the collected data to prepare them for training.
  (3). Model training: Using a large language model (LLM) and the collected data, training a model to generate textual contents matching the expert's writing and conversational style.
  (4). Generation of personality and dialogue: Utilizing the trained model to generate the personality and dialogue of the virtual coach to provide fitness and nutrition advices.
  (5). User interaction: Allowing users to ask questions to the virtual coach through an interactive interface and receive fitness and nutrition advices based on expert's knowledge.

The above examples are intended to demonstrate how to customize specific virtual personalities by using large language models (LLM), and how to enable users to meaningfully interact with these customized virtual personalities.

The above methods or embodiments proposed by the present invention can be executed in a server or similar computer system. For example, the calculation, calculation program and virtual personality creation system 104 shown in FIGS. 2-3 can be executed through the processor 414 to process the required information and can be stored in the storage device 424. The virtual personality creation system 104 proposed by the present invention (refer to FIGS. 1-2), which exists in a server or similar computer system 410 as shown in FIG. 4. Functional block diagram of the server or similar computer system 410 is illustrated in FIG. 4. It should be emphasized that the server/computer system shown in FIG. 4 is only used as an example and should not impose any limitations on the embodiments and scope of usages of the present invention.

As shown in FIG. 4, the server/computer system 410 is in the form of a general computing device. Server/computer system 410 typically includes at least one processor 414 that is communicatively connected to a plurality of peripheral devices through bus subsystem 412. These peripheral devices may include storage devices (e.g., memory subsystem 425 and file storage subsystem 426) 424, user output interface 420, user input interface 422, and network interface subsystem 416. The user output interface 420 and the user input interface 422 can be integrated into user interface 402b of a server/computer system, allowing users to communicate with the computer system 410 from outside. The network interface subsystem 416 provides a connection interface to the external network and is coupled to corresponding interface devices of other computing devices.

According to embodiments of the present invention, the processor 414 may include a multi-core central processing unit (CPU), a graphics processor unit (GPU), a digital signal processor (DSP), an application specific integrated circuit (ASIC), or their combinations, etc.

User input interface 422 may interface with input devices including keyboard, pointing device such as mice, trackball, trackpad or graphics tablet, scanner, touch screen integrated into display, voice input device such as speech recognition system, microphone, and other types of input devices, etc.

User output interface 420 may interface with output devices including a display subsystem, a printer, a fax machine, or a non-visual display such as a sound output device. The display subsystem may include a cathode ray tube display (CRT), a flat panel device such as a liquid crystal display (LCD), a projection device, or other mechanism for producing visual images. The display subsystem may also provide non-visual displays by sound output devices.

Storage device 424 stores programming and data constructs that provide functionality for some or all modules described in the present invention. For example, a program or program module stored in the storage device may be configured to perform the functions of various embodiments of the invention. The aforementioned programs or program modules may be executed by the processor alone or in combination with other processors.

The memory subsystem 425 in the storage device 424 can include a plurality of memories, including a main random access memory (RAM) 430 for storing instructions and data during program execution, and a read-only storage memory (ROM) 432 for storing fixed instructions. File storage subsystem 426 provides persistent storage for program and data files and may include hard drives, optical drives, or removable media cartridges. Functional modules for implementing certain embodiments may be stored in storage device 424 via file storage subsystem 426, or in other machines that can be retrieved/accessed by one or more processors.

The bus subsystem 412 provides a mechanism so that various components and subsystems of the computing device/device can communicate with each other in an expected manner. Although bus subsystem 412 is illustratively presented as a single bus, alternative implementations of bus subsystem 412 may use multiple buses.

Computing device may be of various types, including workstation, server, computing cluster, or other data processing system or computing device.

The present invention provides a new system and method that uses a large language model (LLM) to train and restore the virtual personality and dialogue of specific personnels. Through specialized training strategies and data sets, the method provided by the present invention enables a large language model (LLM) to accurately simulate the conversational style, knowledge background and personality traits of a specific personnel, thereby enhancing the realism of the interaction with the virtual personality.

The present invention successfully integrates and uses the feature of large language model to realize the training and restoration of virtual personalities and dialogue of the specific personnels, and provides interactive experiences with a high degree of naturalness and realism. The present invention can create virtual assistants or chat robots with real personality traits and be applied in the entertainment, business and other professional fields. In addition, the present invention can also be used to retain the value and experience of professionals and to bring potential value for future applications.

While various embodiments of the present invention have been described above, it should be understood that they have been presented by a way of example and not limitation. Numerous modifications and variations within the scope of the invention are possible. The present invention should only be defined in accordance with the following claims and their equivalents.

What is claimed is:

1. A conversational apparatus to generate specific personnel's virtual personality, comprising:
   a processor;
   a storage device coupled to said processor;
   a long-term memory data stored in said storage device and accessible through said processor for receiving and storing processed textual data of a target personnel;
   a virtual personality model stored in said storage device and accessible through said processor, trained by a large language model connected thereto and said processed textual data to generate virtual personality and dialogue matching said target personnel; and
   a short-term memory data stored in said storage device and accessible through said processor, configured to couple with said virtual personality model, used to receive said virtual personality and dialogue matching said target personnel to update iterative training data, enabling said conversational apparatus to maintain coherence with previous dialogues; and
   an interactive module, stored in said storage device and accessible through said processor, configured to couple with said virtual personality model, allowing a user to interact with said virtual personality model to generate multi-round dialogue and providing summary of previous-round dialogue.

2. The conversational apparatus of claim 1, further comprising a data collection and analysis module configured to couple with a long-term memory, used to collect, clean and format said textual data of said target personnel.

3. The conversational apparatus of claim 2, wherein said long-term memory is served as a basis for model training, helping said virtual personality to understand and simulate conversional style and knowledge background of said target personnel.

4. The conversational apparatus of claim 2, wherein said short-term memory is used to update iterative training data.

5. The conversational apparatus of claim 1, further including a prompt input interface configured to input prompts, which include personality setting of said target personnel, to simulate conversation style and knowledge background of said target personnel.

6. The conversational apparatus of claim 5, wherein said prompt input interface is configured to couple with said virtual personality model.

7. The conversational apparatus of claim 1, wherein said generated multi-round dialogue and summary of previous-round dialogue are cleaned and formatted through said data collection and analysis module, and then are fed into and stored in said short-term memory, thereby maintaining coherence with previous conversations generated by said conversational apparatus and knowledge background of said target personnel, and improving context understanding ability of said virtual personality model.

8. The conversational apparatus of claim 6, wherein said virtual personality model based on said large language model is trained by utilizing said processed textual data and said personality setting of said target personnel as training guidance, and trained through dialoguing between said virtual personality model and said large language model.

9. The conversational apparatus of claim 1, wherein said virtual personality model is based on a transformer architecture and has a deep learning architecture for processing sequence data, which includes multiple layers of encoder and decoder with a self-attention mechanism used to capture long-range dependencies in said sequence data.

10. The conversational apparatus of claim 1, wherein said large language model includes Chatgpt, LLaMA, and Bard.

11. The conversational apparatus of claim 1, wherein said conversational apparatus is used to generate a virtual personality and dialogue of said target personnel, including performing the following steps through said processor:
   performing training on said virtual personality model by utilizing said large language model and said processed textual data of said target personnel;
   checking whether training data for said virtual personality model is sufficient;
   if said training data is enough, then said user interactive module generates summary of conversations between said user and said trained virtual personality model based on conversational style, knowledge background and personality traits of said target personnel;

otherwise, said trained virtual personality model generates conversational texts matching said virtual personality of said target personnel to dialogue with said large language model.

12. The conversational apparatus of claim 1, wherein said user interactive module is an interactive interface disposed in said conversation device or in user terminal.

13. The conversational apparatus of claim 1, wherein said processor includes a multi-core central processing unit (CPU), a graphics processor unit (GPU), a digital signal processor (DSP), an application specific integrated circuit (ASIC), or their combinations.

* * * * *